US008082740B2

(12) United States Patent
Luo

(10) Patent No.: US 8,082,740 B2
(45) Date of Patent: Dec. 27, 2011

(54) APPARATUS AND METHODS OF TRANSFERRING HEAT WITH A DIFFERENTIAL MAGNETO-THERMAL FORCE

(76) Inventor: Weili Luo, Orlando, FL (US)

( * ) Notice: Subject to any disclaimer, the term of this patent is extended or adjusted under 35 U.S.C. 154(b) by 602 days.

(21) Appl. No.: 11/922,750

(22) PCT Filed: Jun. 21, 2006

(86) PCT No.: PCT/US2006/024044
§ 371 (c)(1),
(2), (4) Date: Mar. 4, 2009

(87) PCT Pub. No.: WO2007/002127
PCT Pub. Date: Jan. 4, 2007

(65) Prior Publication Data
US 2009/0183513 A1    Jul. 23, 2009

Related U.S. Application Data

(60) Provisional application No. 60/692,460, filed on Jun. 21, 2005.

(51) Int. Cl.
*F25B 21/00* (2006.01)
(52) U.S. Cl. .................................................. 62/3.1

(58) Field of Classification Search ............... 62/3.1, 62/3.2; 165/132
See application file for complete search history.

(56) References Cited

U.S. PATENT DOCUMENTS

| 3,593,047 A | | 7/1971 | Nolta et al. |
| 4,011,044 A | * | 3/1977 | Uzgiris .................. 204/549 |
| 4,447,736 A | | 5/1984 | Katayama et al. |
| 4,706,498 A | * | 11/1987 | Nemnich et al. .......... 73/514.08 |
| 5,714,829 A | | 2/1998 | Guruprasad |
| 5,743,095 A | | 4/1998 | Gschneidner, Jr. et al. |
| 5,887,449 A | | 3/1999 | Pecharsky et al. |
| 6,739,137 B2 | | 5/2004 | Minovitch |

* cited by examiner

*Primary Examiner* — Melvin Jones
(74) *Attorney, Agent, or Firm* — Morris Manning & Martin, LLP; Tim Tingkang Xia, Esq.

(57) ABSTRACT

A method of heat energy transfer, hi one embodiment, the method comprises the steps of establishing a temperature gradient along a first direction in a heat reservoir with a medium and having a first end portion and an opposite, second end portion defining a length, L, therebetween, wherein the first direction is from the first end portion to the second end portion, such that the first end portion has a first temperature, Ti1; and the second end portion has a second temperature, Ti<Tj1; and applying an electromagnetic field in the heat reservoir to establish an electromagnetic field gradient along a second direction to generate a driving force to transfer heat energy from the second end portion to the first end portion.

47 Claims, 13 Drawing Sheets

APPARATUS AND METHODS OF TRANSFERRING HEAT WITH A DIFFERENTIAL MAGNETO-THERMAL FORCE

CROSS-REFERENCE TO RELATED PATENT APPLICATION

This application claims the benefit, pursuant to 35 U.S.C. §119(e), of U.S. provisional patent application Ser. No. 60/692,460, filed Jun. 21, 2005, entitled "Differential Magneto-Thermal Single-Heat-Source Engine," by Weili Luo, which is incorporated herein by reference in its entirety.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [5] represents the 5th reference cited in the reference list, namely, Weili Luo, Tengda Du, and Jie Huang, "Novel Convective Instabilities in a Magnetic Fluid." Phys. Rev. Lett, vol 82, 4134-4137, 1999.

FIELD OF THE INVENTION

The present invention relates generally to heat transfer. More specifically, the present invention relates to apparatus and methods of transferring heat energy from a low temperature side to a high temperature side of a heat reservoir in external fields.

BACKGROUND OF THE INVENTION

The modern theory of heat engines started in the 19th century when James Watt discovered that heat could be converted to work in 1769 [1]. In 1824, Nicolas-Leonard-Sadi Carnot published a paper, describing a principle for engines that could have maximum efficiency [1, 2, 3]. The principle is illustrated in FIG. 1, where a high temperature heat source (reservoir) 110 has a temperature of, $T_h$, and a low temperature heat source (reservoir) 120 has a temperature, $T_l$, where $T_h > T_l$. The engine absorbs an amount of heat energy, $Q_1$, from the high temperature reservoir 110, converts a part of it to work, W, by a working device (e.g. a generator or engine) 140, and deposits the rest of the heat energy, $Q_2$, at the low temperature reservoir 120 with temperature $T_l$. All modern heat engines and many other heat-converting devices such as refrigerators and air conditioners use the same Carnot principle. The efficiency for Carnot type of engine, η, is equal to:

$$\eta = 1 - \frac{T_l}{T_h}. \quad (1)$$

The maximum efficiency obtained in existing Carnot engines is about 50% [4] for practical temperatures and reasonable energy consumption. For conventional technologies, the heat-transferring medium can be recycled while the heat energy output at the low temperature reservoir 120, $Q_2$, is discarded outside, resulting in energy waste.

Therefore, a heretofore unaddressed need exists in the art to address the aforementioned deficiencies and inadequacies.

SUMMARY OF THE INVENTION

When one carefully studies the set up as shown in FIG. 1, there is no fundamental reason why one can not find a mechanism to use the same heat reservoir as both high and low temperature sources. The first aspect of the present invention relates to a mechanism to transfer externally deposited heat (or cold) from cold to hot side (or from hot to cold side) in a fluid with a magnetic force (note that, in the absence of magnetic field, heat deposited to a system with temperature gradient tends to propagate to the cold side due to thermal conduction), which leads to the maximum possible temperature gradient in the system. This mechanism renders the possibility of a new generation of single-heat-source engines by bringing the "waste heat" from the working device back to the heat reservoir, in any orientation regardless the direction of gravity, thus to recycle the output energy from the engine at our convenience and to improve the efficiency of the engine to nearly 100%, much larger than that of existing engines.

The present invention, in another aspect, relates to a mechanism of using a magneto-thermal force that drives deposited heat (or cold) from a cold (hot) to a hot (cold) side of a heat source, a mechanism that has never been used before, and its application to single-heat-source engines that are designed to have efficiency close to 100%. With this invention, the engine operation is neither against (nor limited by) the Kelvin's formulation of the second law of thermodynamics nor by the efficiency limit set by the Carnot theorem. One requirement for this mechanism to work is that the heat-transferring medium with a nonzero magnetic susceptibility is subject to a temperature gradient and a magnetic field along the heat reservoir. The applied magnetic field can be either uniform or has a field gradient. Instead of two separate heat sources commonly used in current technology, the design of the steam engine uses a single source with a temperature gradient that functions as both the high and low temperature reservoirs. The steam returned from the work-generating device provides heat to the rest of the medium in the same reservoir for continuous operation.

To take the maximum advantage of this invention, "free" energies from nature, such as solar energy or energies from other heat-releasing devices such as air conditioners and refrigerators, can be utilized to increase the power generated from this engine. The principle of this invention can be applied to the electric counterpart of a magnetically driven engine since the theory is symmetrical for both magnetic and electric forces. For optimum performance, paramagnetic salts or magnetic particles can be added to enhance the susceptibility of the fluid.

Due to this aspect of the present invention, the formula for efficiency in the traditional textbooks shown in equation (1):

$$\eta = 1 - \frac{T_l}{T_h}$$

is no longer valid because the formula is derived from the Carnot cycle that assumes the existence of two separate heat sources. $T_l$ and $T_h$ in equation (1) are the temperatures for the low and high temperature heat reservoirs in Carnot cycle.

Thus, in one aspect, the present invention relates to a method of heat energy transfer. In one embodiment, the method comprises the steps of establishing a temperature gradient along a first direction in a heat reservoir with a medium and having a first end portion and an opposite, second end portion defining a length, L, therebetween, wherein the first direction is from the first end portion to the second end portion, such that the first end portion has a first temperature, $T_h$, and the second end portion has a second temperature, $T_l < T_h$; and applying an electromagnetic field in the heat reservoir to establish an electromagnetic field gradient along a second direction to generate a driving force to transfer heat energy from the second end portion to the first end portion.

The electromagnetic field can be a magnetic field, and the driving force comprises a differential magneto-thermal force having a force density, $f_m$, satisfying:

$$f_m = \mu_o \chi \nabla H^2 = \frac{\mu_o \chi H_o^2}{(1+\chi)^2}\left(\frac{1}{H_o}\frac{dH_o}{dZ} + \frac{\chi}{(1+\chi)}\frac{1}{T}\frac{dT}{dZ}\right)$$

where $H_o$ represents the strength of the applied magnetic field, $dH_o/dZ$ is the external field gradient along the length L, x is the magnetic susceptibility of the medium, $dT/dZ$ is the local temperature gradient along the length L, and $\mu_o$ is the permeability in vacuum. Here we assume that the medium is a paramagnet obeying the Curie's Law.

The magnetic field is applied along the second direction that is opposite to the first direction, wherein $dH_o/dZ$ and $dT/dZ$ have opposite signs.

The method in this embodiment further comprises the step of placing at least a pair of permanent magnets and proximate to the first end portion and the second end portion of the heat reservoir, respectively, or magnet(s) with different configuration and shape, to generate a magnetic field.

The medium has a nonzero magnetic susceptibility. The medium comprises a paramagnetic or diamagnetic fluid (for a diamagnetic fluid, $dH_o/dZ$ and $dT/dZ$ have same sign, i.e. the field and temperature gradients are parallel to each other), wherein the paramagnetic medium comprises solvent and magnetic particles.

In another embodiment, the electromagnetic field can be an electric field, and the driving force comprises an electric force.

In another aspect, the present invention relates to a system of heat energy transfer. In one embodiment, the system comprises a heat reservoir with a medium and having a first end portion and an opposite, second end portion defining a length, L, therebetween; means for establishing a temperature gradient along a first direction in the heat reservoir, wherein the first direction is from the first end portion to the second end portion, such that the first end portion has a first temperature, $T_h$, and the second end portion has a second temperature, $T_l < T_h$; and means for applying an electromagnetic field in the heat reservoir to establish an electromagnetic field gradient along a second direction to generate a driving force to transfer heat energy from the second end portion to the first end portion.

The electromagnetic field can be a magnetic field, and the driving force comprises a differential magneto-thermal force having a force density, $f_m$, satisfying:

$$f_m = \mu_o \chi \nabla H^2 = \frac{\mu_o \chi H_o^2}{(1+\chi)^2}\left(\frac{1}{H_o}\frac{dH_o}{dZ} + \frac{\chi}{(1+\chi)}\frac{1}{T}\frac{dT}{dZ}\right)$$

where $H_o$ represents the strength of the applied magnetic field, $dH_o/dZ$ is the external field gradient along the length L, x is the magnetic susceptibility of the medium, $dT/dZ$ is the local temperature gradient along the length L, and $\mu_o$ is the permeability in vacuum.

The magnetic field is applied along the second direction that is opposite to the first direction, wherein $dH_o/dZ$ and $dT/dZ$ have opposite signs.

The means for applying a magnetic field comprises at least a pair of permanent magnets and placed proximate to the first end portion and the second end portion of the heat reservoir, respectively, or magnet(s) with different configuration and shape, to generate a magnetic field. The medium has a non-zero magnetic susceptibility. The medium comprises a paramagnetic or diamagnetic medium, wherein the paramagnetic medium comprises solvent and magnetic particles.

In another embodiment, the electromagnetic field can be an electric field, and the driving force comprises an electric force.

The means for applying an electric field comprises a DC or an AC electric source connectable to the first end portion and the second end portion of the heat reservoir, respectively, to generate an electric field.

In yet another aspect, the present invention relates to a system of heat energy transfer. In one embodiment, the system comprises a heat reservoir with a medium and having a first end portion and a second end portion defining a length, L, therebetween, wherein the first end portion has a first temperature, $T_h$, and the second end portion has a second temperature, $T_l < T_h$, thereby establishing a temperature gradient along the reservoir length L in a first direction; and a field applied to the reservoir to establish a field gradient along the reservoir length L in a second direction, wherein the applied field generates in the medium a driving force to transfer heat energy from the second end portion to the first end portion of the reservoir.

The applied field can be a magnetic field, and the medium has a nonzero magnetic susceptibility, wherein the medium comprises solvent, paramagnet salt, magnetic particles, or a combination of them. The driving force comprises a differential magneto-thermal force.

In this embodiment, the system further comprises a pair of permanent magnets and placed proximate to the first end portion and the second end portion of the heat reservoir, respectively, or magnet(s) with different configuration and shape, for generating a magnetic field.

The applied field can be an electric field, and the medium has non-zero electric polarizations, wherein the driving force comprises a differential electro-thermal force.

The applied field can also include gravity, and the driving force partially comprises a gravitation force.

The system may further comprise a coil helically formed in a cone-shaped form having an apex end and a base end, wherein the coil is placed in the reservoir such that the apex end and the base end of the coil are proximate to the first end portion and the second end portion of the reservoir, respectively.

The system may further comprise a power generator or an engine having an input, a first output and a second output, wherein the input is in communication with the reservoir through the first end portion of the reservoir, and the first output is in communication with the reservoir through the apex end of the coil placed in the reservoir. In operation, the power generator or engine absorbs an amount of heat, $Q_1$, from the reservoir through the input to generate a power or an amount of work, W, outputting from the second output, and deposits an amount of heat, $Q_2$, to the reservoir through the first output, wherein $Q_2 = (Q_1 - W)$.

The system may further comprise an additional reservoir of fluid being in communication with the reservoir, wherein the additional reservoir is adapted to have a potential energy higher than that of the reservoir.

The system may further comprise an input channel in communication with the reservoir for inputting an amount of external energy into the reservoir at the first end portion.

The external energy may comprise solar energy.

In a further aspect, the present invention relates to an apparatus of converting heat energy into mechanical energy. In one embodiment, the apparatus comprises a heat reservoir with a medium; means for establishing a temperature gradient in the heat reservoir; means for generating a differential magneto-thermal force in the heat reservoir, wherein the differential magneto-thermal force is capable of transferring heat energy from a first position having a low temperature to a second position having a high temperature in relation to the heat reservoir; and a power generator having an input, a first output and a second output, wherein the input is in communication with the heat reservoir through the first end portion, and the first output is in communication with the heat reservoir through the apex end of the coil placed in the heat reservoir, wherein in operation, the power generator absorbs an amount of heat, $Q_1$, from the reservoir through the input to generate an amount of work, W, outputting from the second output, and deposits an amount of heat, $Q_2$, to the reservoir through the first output, wherein $W=(Q_1-Q_2)$.

The heat reservoir has a first end portion and a second end portion defining a length, L, therebetween, wherein the first end portion has a first temperature, $T_h$, and the second end portion has a second temperature, $T_l<T_h$.

In one embodiment, the medium has a nonzero magnetic susceptibility. The means for generating a differential magneto-thermal force comprises at least a pair of permanent magnets and placed proximate to the first end portion and the second end portion of the heat reservoir, respectively.

In yet another aspect, the present invention relates to a method of converting heat energy of a heat reservoir with a medium to mechanical energy, wherein the heat reservoir has a first end portion with a first temperature and an opposite, second end portion with a second temperature that is lower than the first temperature. In one embodiment, the method comprises the steps of providing a power generator with an amount of heat energy, $Q_1$, from the first end portion of the heat reservoir; converting the amount of heat energy into an amount of mechanical energy, W, from the power generator; depositing the remaining heat energy, $Q_2$, from the power generator to the second end portion of the heat reservoir, wherein $Q_2=(Q_1-W)$; and transferring heat energy from the second end portion to the first end portion of the heat reservoir.

The method may further comprise the step of applying a magnetic field between the first end portion and the second end portion of the heat reservoir, and the medium comprises a paramagnetic or diamagnetic medium, wherein the paramagnetic medium comprises solvent and magnetic particles. The transferring step is performed by a differential magneto-thermal force, wherein the differential magneto-thermal force is a function of the applied magnetic field, the field gradient, and the temperature gradient in the heat reservoir.

The depositing step is performed with a coil helically formed in a cone-shaped form having an apex end and a base end, wherein the coil is placed in the reservoir such that the apex end and the base end of the coil are proximate to the first end portion and the second temperature end portion of the reservoir, respectively. The depositing step comprises the steps of depositing a residual substance carrying on the remaining heat energy $Q_2$ from the power generator to the coil from the apex end of the coil; and delivering the residual substance in the coil to the second end portion of the reservoir from the base end of the coil.

The method may further comprise the step of inputting an amount of external energy into the reservoir at the first end portion, wherein the external energy comprises solar energy.

The medium can be a medium having non-zero electric polarizations, and the driving force comprises an electric force.

The driving force can also include a gravitation force.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 3 shows the differential magneto-thermal force in a temperature gradient according to one embodiment of the present invention $f_{hot}$ is the force density on a volume element whose temperature is higher than its surrounding and $f_{cold}$ is that on volume element whose temperature is colder than its surrounding. This force is dependent on the direction of the field gradient.

DETAILED DESCRIPTION OF THE INVENTION

Figure 1:
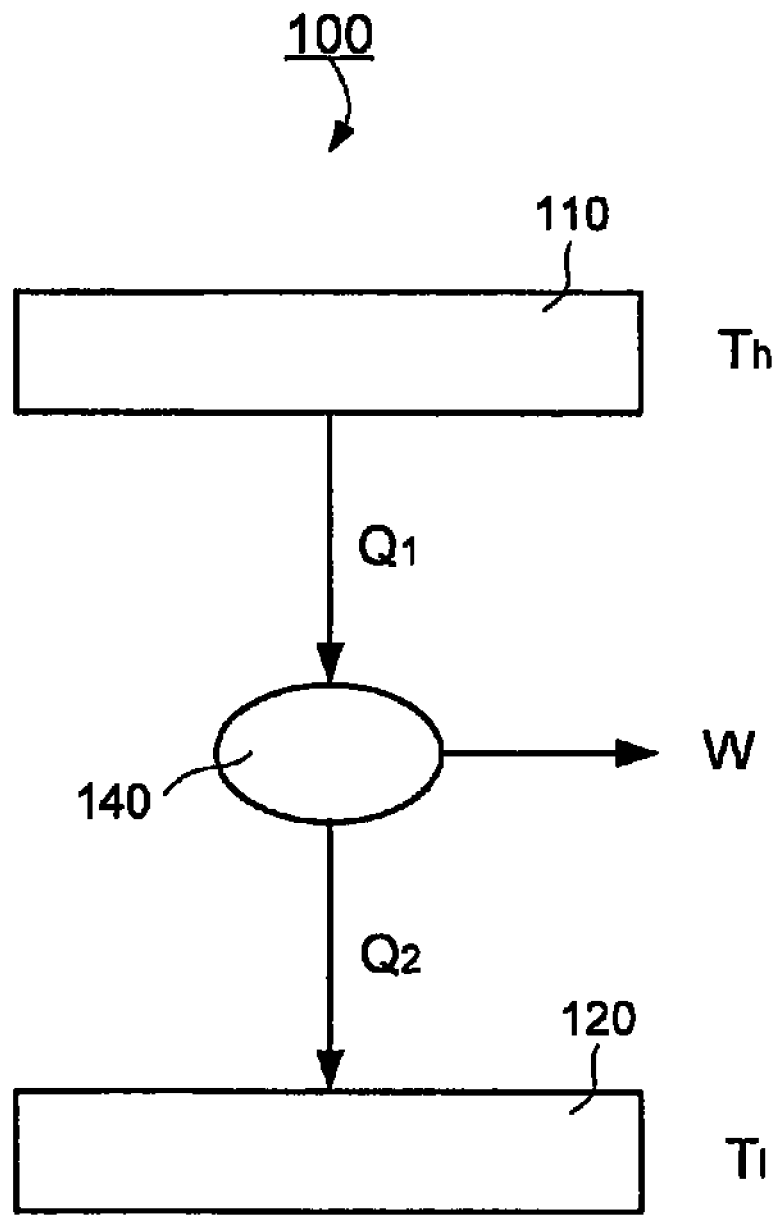
FIG. 1 shows the general known principle for a Carnot heat engine.

The present invention is more particularly described in the following examples that are intended as illustrative only since numerous modifications and variations therein will be apparent to those skilled in the art. Various embodiments of the invention are now described in detail. Referring to the drawings FIGS. 1-13, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. The terms used in this specification generally have their ordinary meanings in the art, within the context of the invention, and in the specific context where each term is used.

Overview of the Invention

This invention in one aspect provides a new mechanism to transfer heat in a fluid system and its applications in heat-converting devices such as, but not limited to, heat engines, refrigerators, air conditioners, and the like. In one embodiment, the mechanism relates to a system utilizing a magnetic body force applied upon a heat reservoir that has an established temperature gradient. The system has a nearly perfect efficiency and discharges no exhaust to environment. Because the magnetic force driving the heat flow can be generated from, for example, permanent magnets that do not need any external power, the system can operate without consumption of additional external power once the cycle has started. Even with electromagnets, the energy consumed will be minimum. The new system can also recycle the waste heat from other appliances or devices. Because the equations used for the magnetic force in this invention is symmetric for electric force, all results in this disclosure can be applied to their electric counter part as well.

In one aspect of the present invention, a system of heat energy transfer is provided. In one embodiment, referring to FIG. 4, a system 400 of heat energy transfer has a heat reservoir 410 with a fluid medium 415 and having a first end portion 412 and an opposite, second end portion 414 defining a length, L, therebetween. The system 400 also has means for establishing a temperature gradient along a first direction 452 in the heat reservoir 410, wherein the first direction 452 is from the first end portion 412 to the second end portion 414, such that the first end portion 412 has a first temperature, $T_h$, and the second end portion 414 has a second temperature, $T_l < T_h$. And the system 400 further has means for applying an electromagnetic field in the heat reservoir 410 to establish an electromagnetic field gradient along a second direction 454 to generate a driving force to transfer heat energy from the second end portion 414 to the first end portion 412.

In one embodiment, the electromagnetic field is a magnetic field, and the driving force comprises a differential magneto-thermal force having a force density, $f_m$, satisfying:

$$f_m = \mu_o \chi \nabla H^2 = \frac{\mu_o \chi H_o^2}{(1+\chi)^2}\left(\frac{1}{H_o}\frac{dH_o}{dZ} + \frac{\chi}{(1+\chi)}\frac{1}{T}\frac{dT}{dZ}\right)$$

where $H_o$ represents the strength of the applied magnetic field, $dH_o/dZ$ is the external field gradient along the length L, $\chi$ is the magnetic susceptibility of the medium, $dT/dZ$ is the local temperature gradient along the length L, and $\mu_o$ is the permeability in vacuum. In this embodiment, the second direction 454 is opposite to the first direction 452, wherein $dH_o/dZ$ and $dT/dZ$ have opposite signs.

The means for applying an electromagnetic field can be at least a pair of permanent magnets 432 and 434 placed proximate to the first end portion 412 and the second end portion 414 of the heat reservoir 410, respectively, to generate a magnetic field. Other means, such as AC field generator, can also be utilized to practice the present invention.

The medium 415 has a nonzero magnetic susceptibility. The medium 415 can be a paramagnetic or diamagnetic medium. The paramagnetic medium, in one embodiment, contains magnetic particles.

In another embodiment, the electromagnetic field is an electric field, and the driving force comprises an electric force. In this embodiment, the means for applying an electromagnetic field comprises a DC or an AC electric source connectable to the first end portion 412 and the second end portion 414 of the heat reservoir 410, respectively, to generate an electric field.

In yet another embodiment, the electromagnetic field can have both an electric field component and a magnetic field component.

Figure 4:
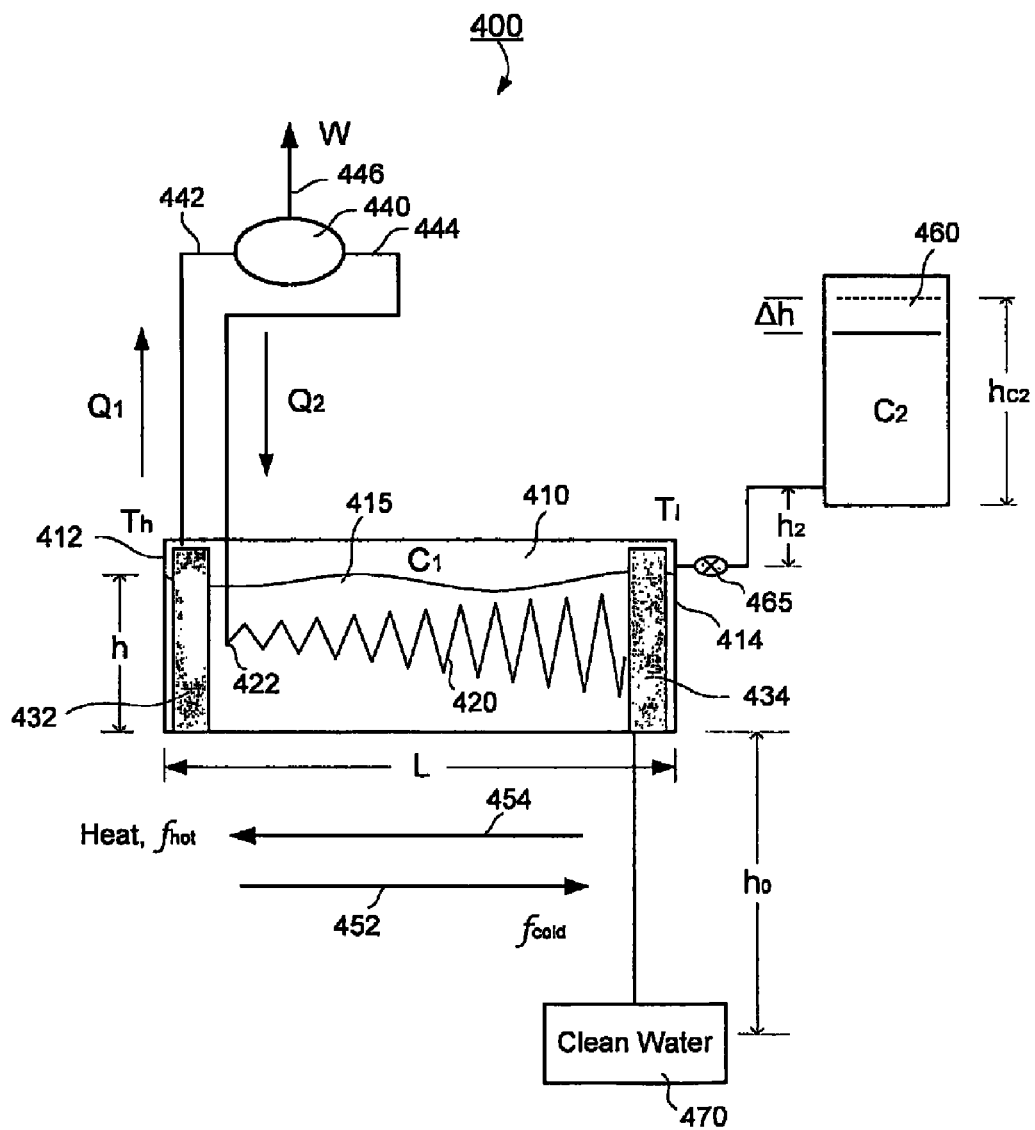
FIG. 4 shows a general schematic of self sustained steam engine with the boiler that runs continuously once the initial temperature gradient is established according to one embodiment of the present invention.

Still referring to FIG. 4, the system 400 may further have a coil 420 helically formed in a cone-shaped form having an apex end 422 and a base end 424, wherein the coil 420 is placed in the reservoir 410 such that the apex end 422 and the base end 424 of the coil 420 are proximate to the first end portion 412 and the second end portion 414 of the reservoir 410, respectively.

The system 400 may further have a power generator or an engine 440 having an input 442, a first output 444 and a second output 446, wherein the input 442 is in communication with the reservoir 410 through the first end portion 412 of the reservoir 410, and the first output 444 is in communication with the reservoir 410 through the apex end 422 of the coil 420 placed in the reservoir 410. In operation, the power generator or the engine 440 absorbs an amount of heat, $Q_1$, from the reservoir 410 through the input 442 to generate an amount of work, W, outputting from the second output 446, and deposits an amount of heat, $Q_2$, to the reservoir 410 through the first output 444, wherein $Q_2=(Q_1-W)$.

The system 400 may further have an additional reservoir 460 being in fluid communication with the reservoir 410, controllable by a valve 465, wherein the additional reservoir 460 is adapted to have a potential energy higher than that of the reservoir 410. A clean water reservoir 470 is provided as well.

Figure 5:
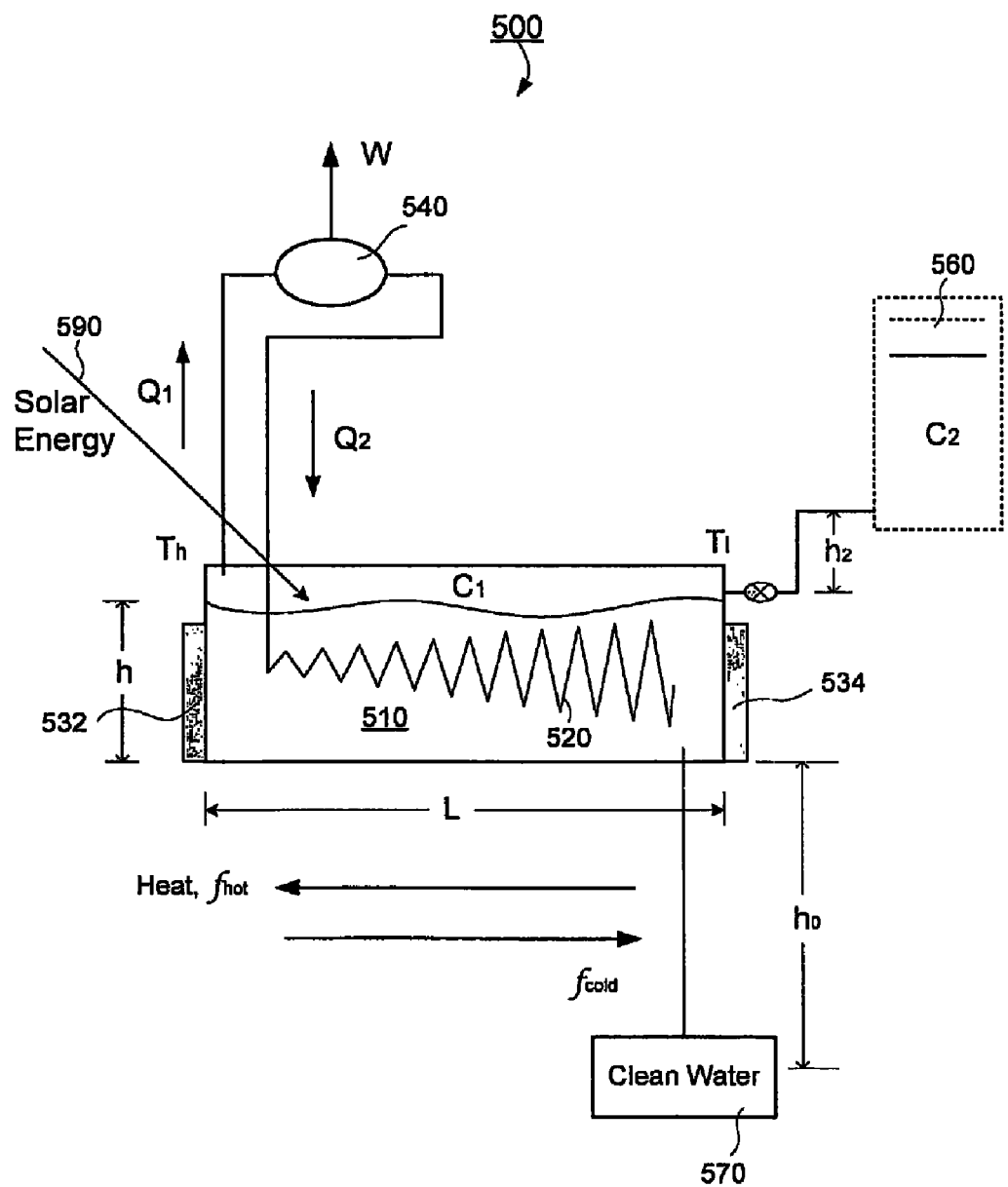
FIG. 5 shows the same design as in FIG. 4 but with solar energy as additional power input.

In another embodiment, referring to FIG. 5, a system 500 of heat energy transfer has a heat reservoir 510 and a coil 520. The system 500 is similar to the system 400 but also has an input channel 590 in communication with the reservoir 510 for inputting an amount of external energy into the reservoir 510. In one embodiment, the external energy comprises solar energy.

EXAMPLES AND IMPLEMENTATIONS

Without intent to limit the scope of the invention, further exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

FIG. 1 illustrates typical working principle in the existing technology of a general engine based on Carnot cycle. The high temperature heat source at temperature $T_h$ provide heat $Q_1$ to do work, W, to outside. In this technology, amount of heat $Q_2$ cannot be converted to work and has to be deposited to the low temperature source $T_l$. In most cases, the heat was released to the environment as in steam engines, car engines, combustion engines, and all other modern engines, as well as all power generators. The released heat pollutes the environment and contributed to global warming.

Figure 2:
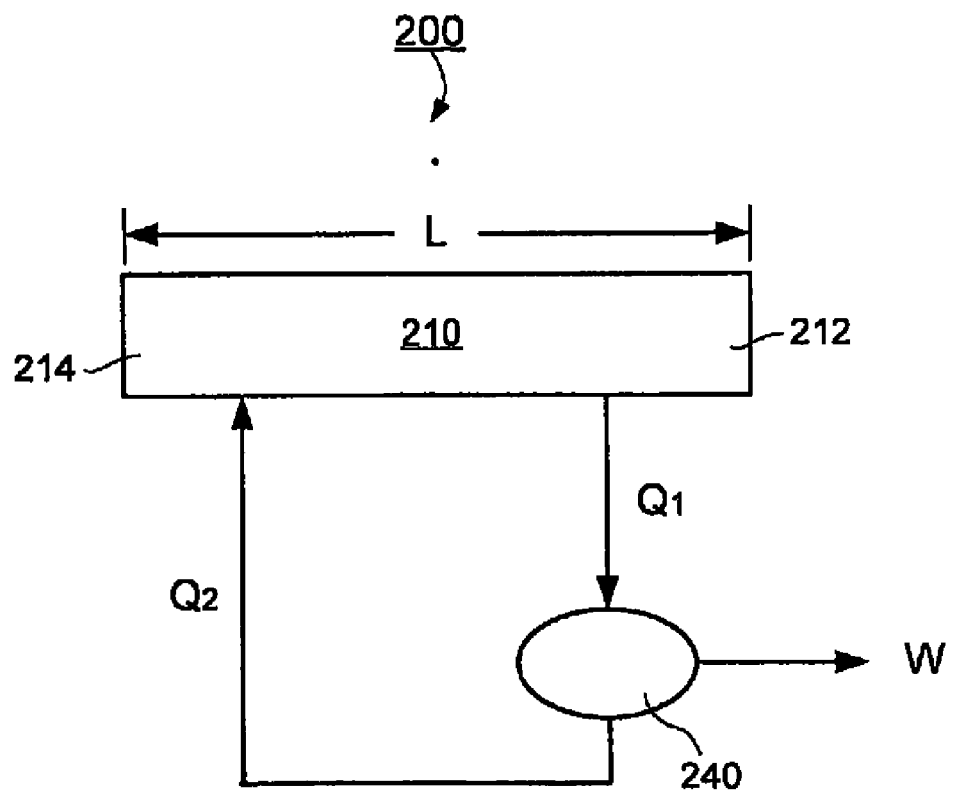
FIG. 2 shows a block diagram for the principle of a single-heat-source engine according to one embodiment of the present invention.
Figure 3A:
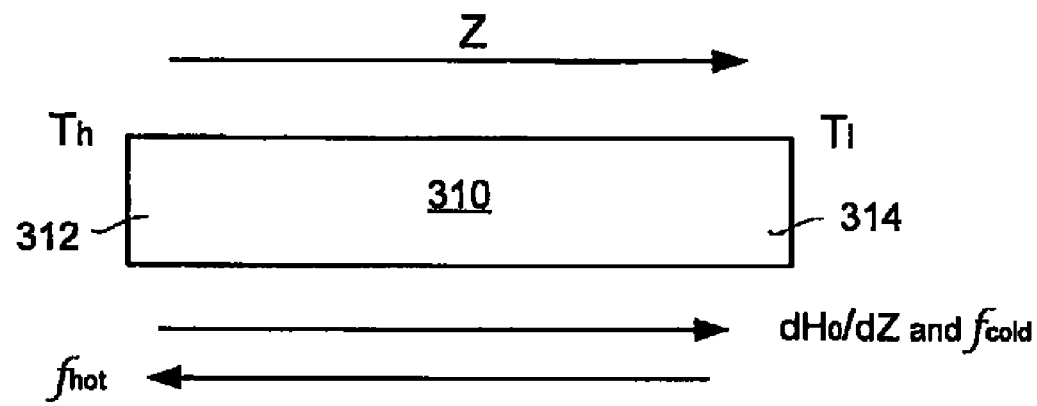
FIG. 3(a) shows requirements for the direction of the field gradient for a paramagnetic heat-transferring medium.
Figure 3B:
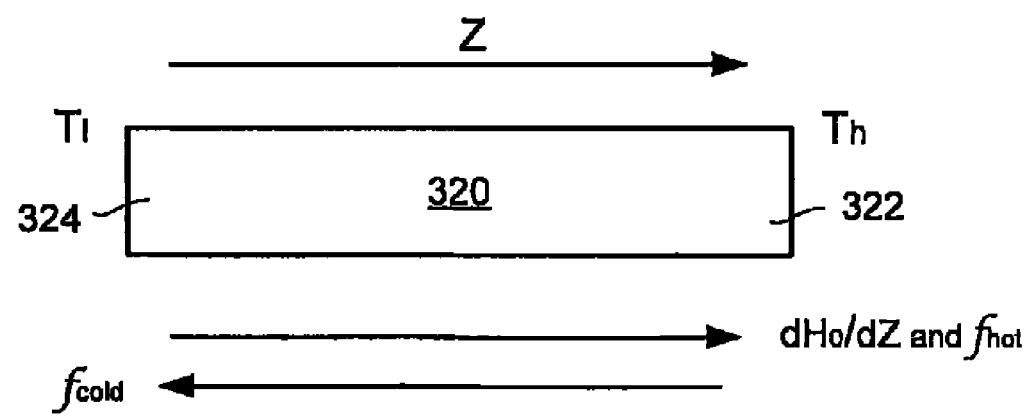
FIG. 3(b) shows requirement for the direction of the field gradient for a diamagnetic heat-transferring medium.

In one aspect of the present invention, a system 200 with a heat source 210 that has a temperature gradient from an end 212 to another end 214 along a length L is provided as illustrated in FIG. 2 and a driving force is discovered that can transfer deposited heat from low to high temperature. If one assumes in a heat-transfer medium this process is much faster than that of thermal conduction, one can have the following cycle: heat, $Q_1$, can flow out of the high temperature side ($T_h$) 212 of the source, does work, W, by an engine or a power generator 240, to outside, then the residual heat, $Q_2$, flows back to the low temperature side ($T_l$) 214 of the reservoir. Accordingly, not only the cycle is complete, leading to a continuous operation, but the energy from $Q_2$ is also recycled for further power output without harming the environment. The first important aspect of this invention is to design a driving force that can bring the recycled heat $Q_2$ from $T_l$ to $T_h$ side as shown in FIG. 2. Therefore, one needs a force density that not only drives a fluid element hotter than its surrounding (thus has smaller magnetic susceptibility) to higher temperature side, but it also drives a fluid element with temperature colder than its surrounding (thus has larger magnetic susceptibility) to the lower temperature side, thus sustain the temperature difference between the hot and cold sides. This requirement is illustrated in FIG. 3, where $f_{hot}$ and $f_{cold}$ represent force direction for hotter and colder components. As shown in FIG. 3(a), a reservoir 310 is with a force $f_{hot}$ from lower temperature end 314 to higher temperature end 312, and with dHo/dZ and $f_{cold}$ acting on the same direction. As shown in FIG. 3(b), however, a reservoir 320 is with force $f_{cold}$ acting from higher temperature end 322 to the lower temperature end 324, and with dHo/d % and $f_{hot}$ acting on the direction. For most of fluids the magnetic susceptibility is linearly proportional to its density, following the Curie's Law, and the force density satisfies the aforementioned requirement is the differential magneto-thermal force density below [51]:

$$f_m = \mu_o \chi \nabla H^2 = \mu_o \chi H_o^2 \left( \frac{1}{H_o} \frac{dH_o}{dZ} + \chi \frac{1}{T} \frac{dT}{dZ} \right) \quad (2)$$

where $H_o$ represents the strength of the applied magnetic field, $dH_o/dZ$ the external field gradient, $\chi$ the magnetic susceptibility of the medium, dT/dZ the local temperature gradient, and $\mu_o$ the permeability in vacuum. For usual paramagnetic medium, $\chi \ll 1$, $(1+\chi) \sim 1$, then $$f_m = \mu_o \chi \nabla H^2 = \mu_o \chi H_o^2 \left( \frac{1}{H_o} \frac{dH_o}{dZ} + \chi \frac{1}{T} \frac{dT}{dZ} \right) \quad (2')$$

Taking Z as the coordinate indicating the field gradient direction as shown in FIG. 3, the requirement is then that force density in (2) and (2') be positive for volume element with $\chi$ larger than the surrounding, i.e. $f_m > 0$ for larger $\chi$, or $$\frac{1}{H_o} \frac{dH_o}{dZ} + \chi \frac{1}{T} \frac{dT}{dZ} > 0 \quad (3)$$

In the coordinate of FIG. 3(a), dT/dZ<0 therefore we require that $dH_o/dZ>0$ and from (3), we should have:

$$\frac{dH_o}{dZ} > H_o \chi \frac{1}{T} \frac{dT}{dZ}.$$

To enhance the force thus the efficiency of transferring the heat from low temperature to high temperature, we can choose magnetic (or electric) nanocolloids such as magnetic (or electric) fluid consisting of nanosized magnetite particles suspended in a solvent. For this fluid, the force density expression for the transfer of heat from low T to high T becomes:

$$f_m = \mu_o \chi \nabla H^2 \quad (4)$$

$$= \frac{\mu_o \chi H_o^2}{(1+\chi)^2} \left( \frac{1}{H_o} \frac{dH_o}{dZ} + \frac{\chi}{(1+\chi)} \frac{1}{T} \frac{dT}{dZ} - \frac{\chi}{(1+\chi)} \frac{1}{C} \frac{dC}{dZ} \right)$$

Where C is the concentration of magnetic (or electric) species. With added magnetic particles, we no longer have $\chi \ll 1$. Then the requirement in (3) becomes:

$$\frac{1}{H_o} \frac{dH_o}{dZ} + \frac{\chi}{(1+\chi)} \frac{1}{T} \frac{dT}{dZ} - \frac{\chi}{(1+\chi)} \frac{1}{C} \frac{dC}{dZ} > 0 \quad (5)$$

For diamagnetic medium (such as pure water), $\chi<0$, the field gradient should be parallel to the temperature gradient, as illustrated in FIG. 3(b).

With the new mechanism to drive the deposited heat from the low to the high temperature side, the cycle in FIG. 2 is completed. Both the field and field gradient can be from one or a pair of permanent magnet that could be designed to satisfy the requirement in (3) or (5).

The efficiency of the system or engine in FIG. 2 is:

$$\eta = \frac{work}{heat\ absorbed} = \frac{W}{Q_1 - Q_2} = 100\% \quad (12)$$

Of course, in reality, there will always be heat loss due to imperfection of materials that renders the engine less than 100% efficient. Nevertheless, this is as close as one can get to the highest efficiency possible, in contrast to the current technology depicted in FIG. 1 whose efficiency is less than 50%.

The force in equation (2) and (4) will keep the recycled heat going toward the high temperature direction. In order to return the whole system back to its original state after one cycle, one can allow the returned matter to be discharged to outside thus to provide a mechanism for the fluid tank to be filled by an automatic process.

As a realization of the principle in FIG. 2, a second embodiment of the invention is shown in FIG. 4, where a steam engine 400 that can run continuously once the initial required conditions are established. The container $C_1$ holds heat-transferring liquid, which in this case is water. Temperature and field gradients are set up at the beginning with the field and field gradient from a one or more permanent magnet 432, 434. With paramagnet salt or magnetic particles, the fluid can be easily made paramagnetic with susceptibility much larger than that of water itself (even with pure water, the design principle should still work but with different orientation of the field gradient and much larger field). Let the initial temperature at hot side be $T_h > T_b = 100°$ C., the boiling point, and the low temperature side be the room temperature, i.e. $T_l = 25°$ C. During each cycle, a volume element of hot fluid with volume V and mass $m_1$ (this volume element is hotter than its surrounding due to recycled heat released to $C_1$) travels from the cold side to the hot side guided by the differential magneto-thermo force in equation (2) or (4), absorbs heat along the way, goes through phase transition to steam while absorbs latent heat, absorbs more heat after that so the temperature is raised from the boiling point $T_b$ to the operating temperature of the engine, $T_h$. The total heat absorbed, $Q_1$, is carried by the medium to the working device that does work, W, to outside, and returns heat $Q_2$ back to fluid in $C_1$. The returned steam runs though $C_1$ slowly so it can fully exchange heat with the surrounding, condensing to fluid again, in this case, one obtains clean water, which can be received in reservoir or container 470. A valve or asymmetrical condenser 465 can be used. The container $C_2$ is a reservoir to provide water for refilling $C_1$ to the original level after each cycle. The magnetic force should be such that the force on a volume element with susceptibility, $\chi$, larger (thus colder) than its surrounding fluid is towards the low temperature side no matter what $\chi$ is, as shown for $f_{cold}$, and opposite is true for volume element with smaller $\chi$ (hotter), as shown for $f_{hot}$ in FIG. 4. When a cycle is complete, $C_1$ returns to the original state thus energy and entropy changes for $C_1$ is zero. Then a new cycle starts.

Like the system or engine shown in FIG. 2, this steam engine 400 also has the perfect efficiency:

$$\eta = \frac{work}{heat\ absorbed} = \frac{W}{Q_1 - Q_2} = 100\%$$

Since the expression for electromagnetic force is symmetric between magnetic force and electric force in equations (2) and (4), the invention here also applies to an engine with para-electric fluid as the working medium in an electric field, electric field gradient, and temperature gradient. The principle and applications mentioned above also apply to other types of driving forces such as gravitational force coupled with temperature gradient. In gravitational field, however, the reservoir has to be vertical to have large enough potential energy to be transferred to usable work.

The output power can be further increased by taking advantage of solar energy as shown in FIG. 5. The sun light can be collected at the hot side, $T_h$, by multiple solar energy lenses (not shown) that focus the solar energy to the desired location. In this embodiment, the top part of the heat bath can be made of transparent materials that can stand boiling temperature of water, which is doable with current technology.

Figure 6:
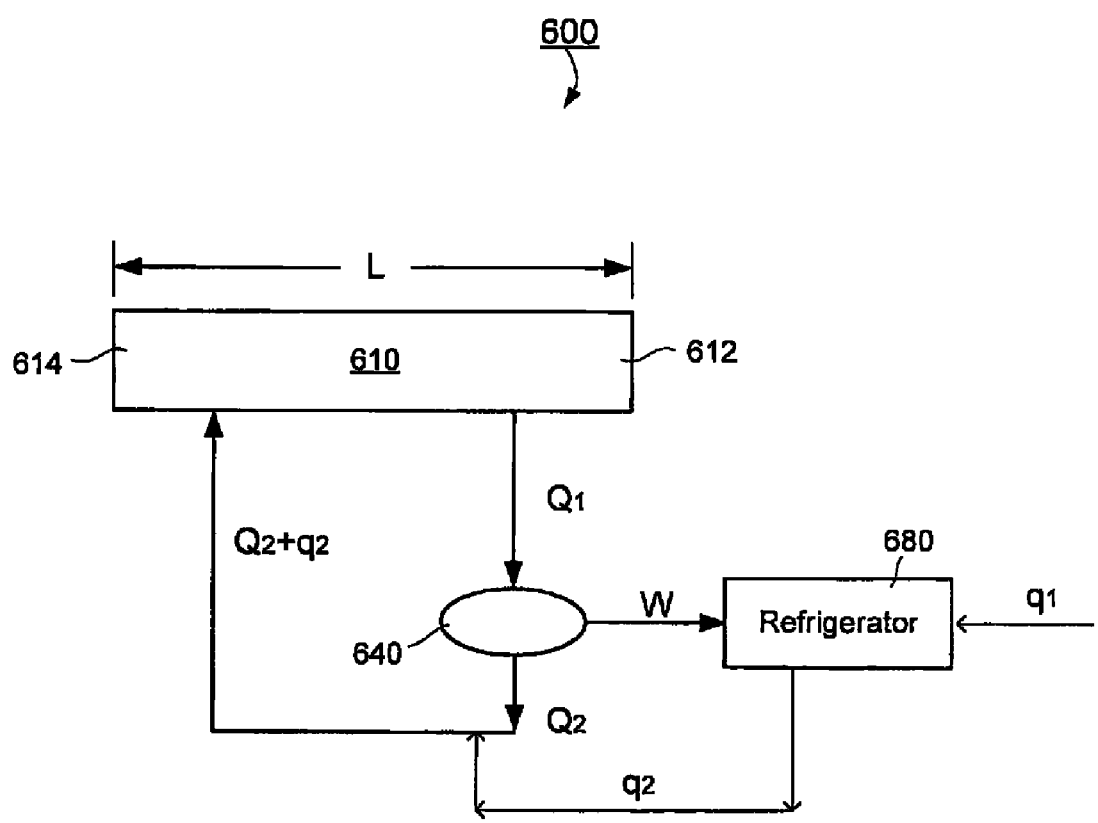
FIG. 6 shows the principle for a heat engine/refrigerator hybrid that takes the power output from the engine as the power input for the refrigerator and the "waste heat" from the refrigerator is recycled to the heat reservoir of the engine, according to one embodiment of the present invention.
Figure 7:
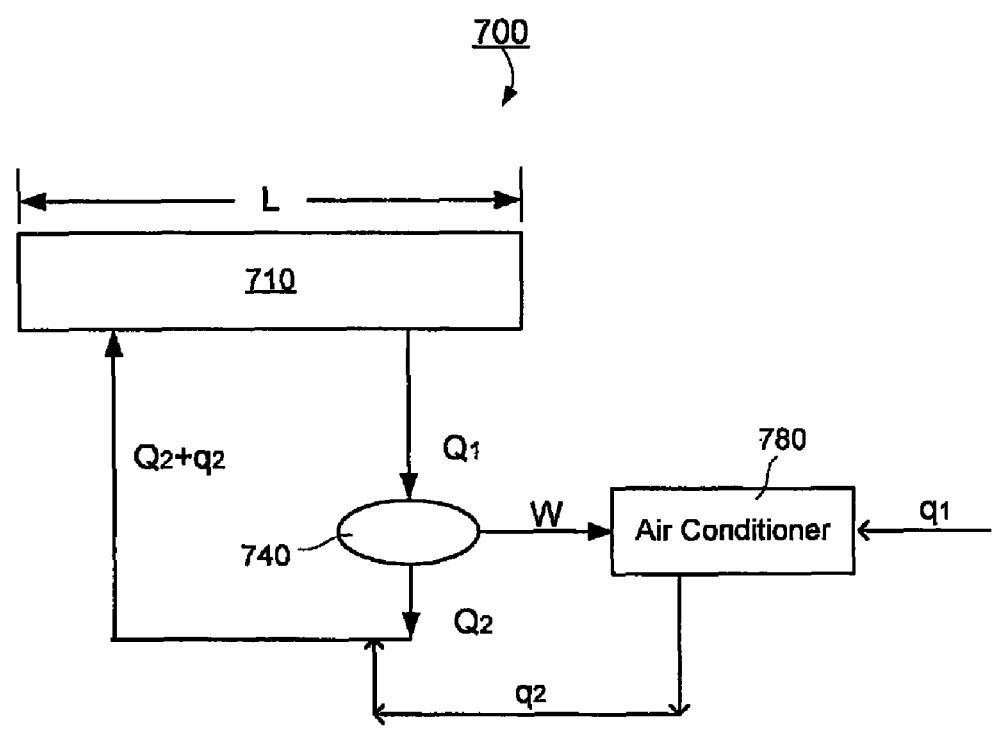
FIG. 7 shows the principle for a generator/air conditioner hybrid that takes the power output from the generator as the power input for the air conditioner and the "waste heat" from the air conditioner is recycled to the heat reservoir for the generator, according to one embodiment of the present invention.
Figure 8:
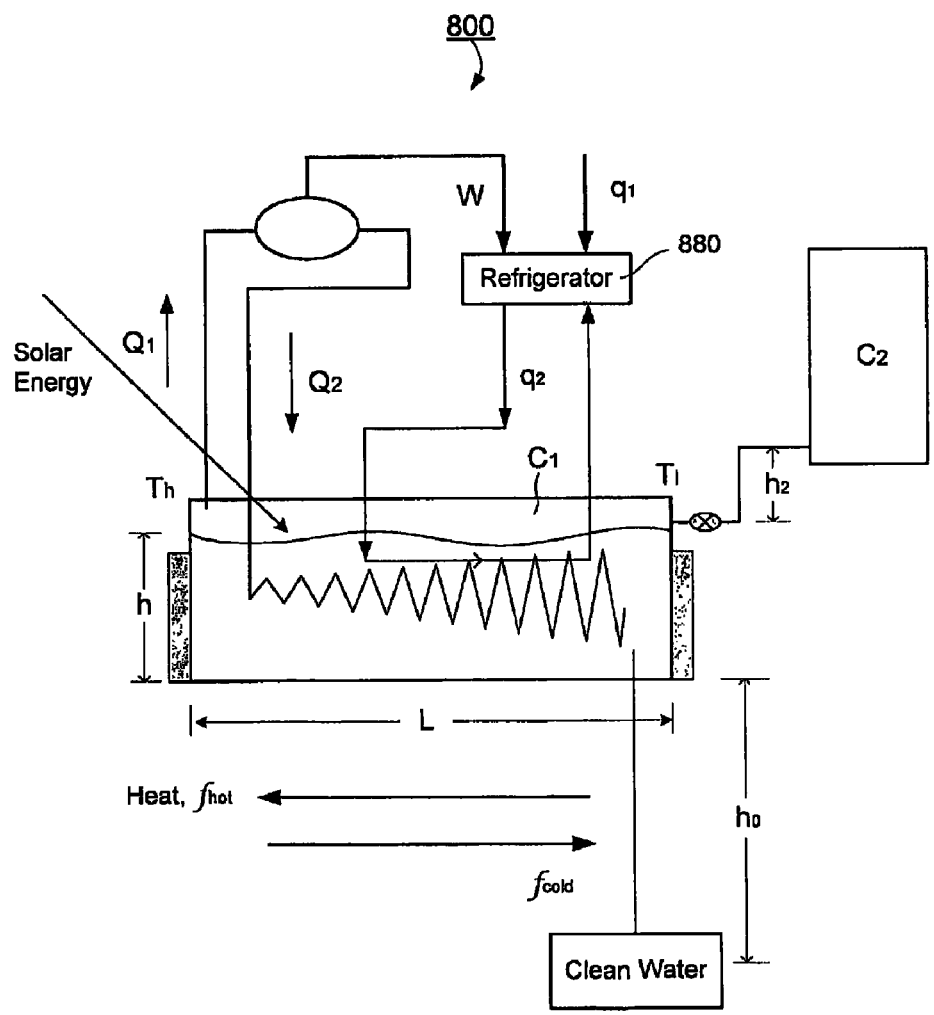
FIG. 8 shows a system of a generator/refrigerator hybrid with the boiler according to one embodiment of the present invention. The condenser of the refrigerator is immersed inside the heat reservoir of the engine.
Figure 9:
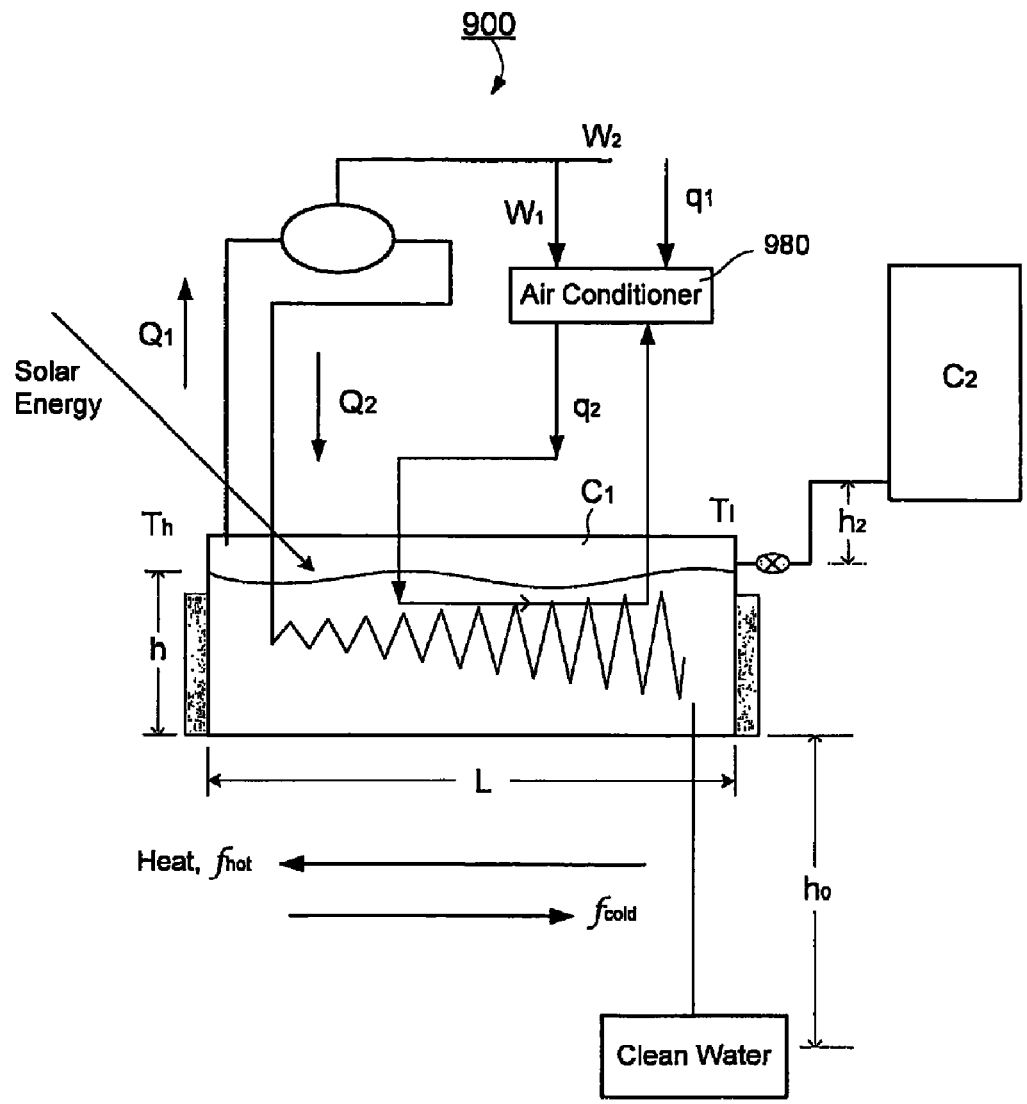
FIG. 9 shows a system of a generator/air conditioner hybrid with the boiler according to another embodiment of the present invention. The condenser of the air conditioner is immersed inside the heat reservoir of the engine.
Figure 10:
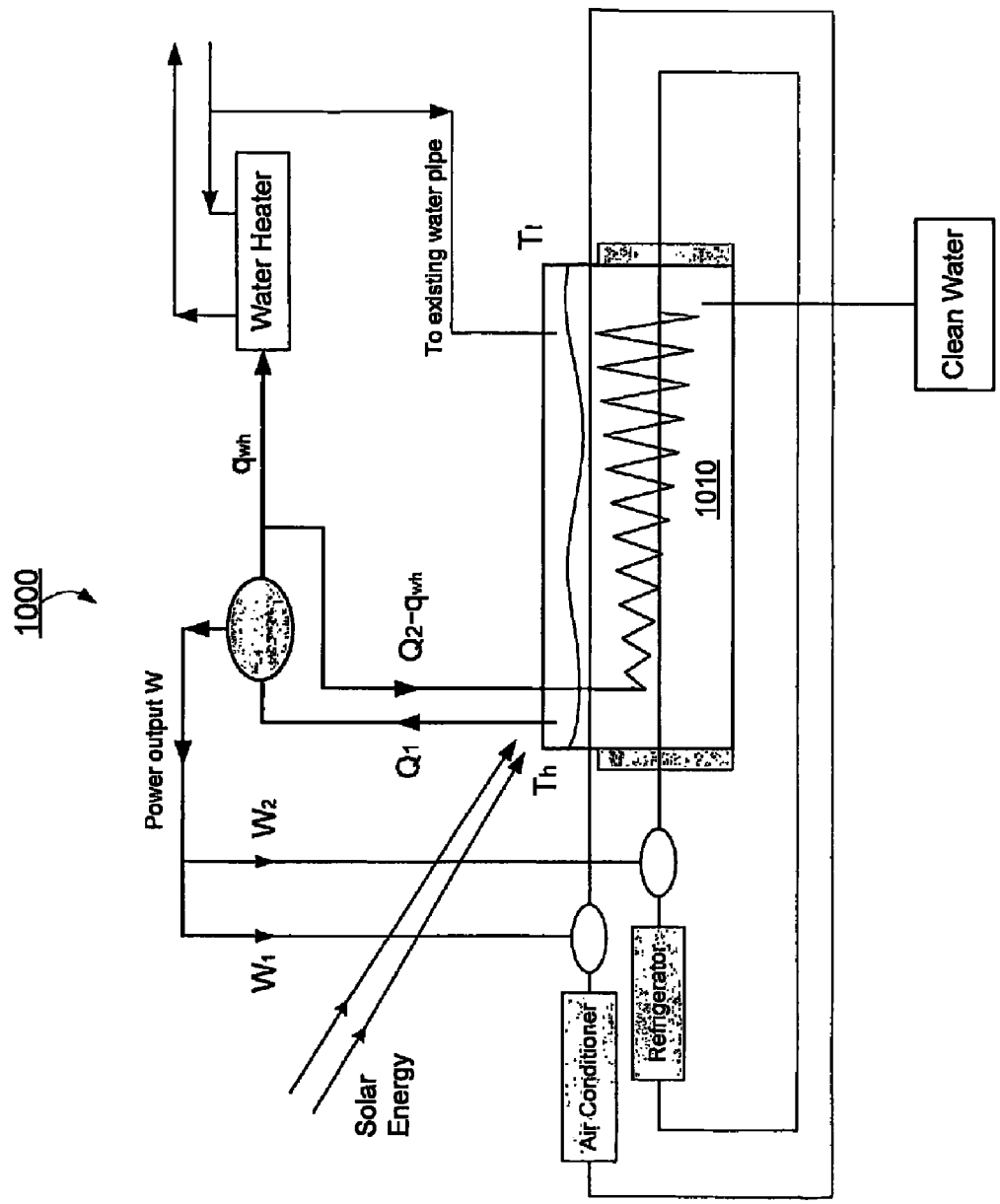
FIG. 10 shows a heating-cooling network with a single-heat-source generator with the boiler driving by differential magneto-thermal force according to one embodiment of the present invention.

In addition to boiler and engine/generator combination, the invention also has other applications. Two more examples are illustrated in FIGS. 6-9. FIG. 6 shows a block diagram of a system 600 having a refrigerator 680 that uses the work output from a generator 640 as the input power to take the heat $q_1$ out of targeted area and deposits heat $q_2$ back to the heat reservoir 610 at end 614. The real design is shown in FIG. 8, where a system 800 with a refrigerator 880 in current refrigeration technology recycles heat to the boiler bath. This design of combining the boiler and the generator with the refrigerator will further reduce the heat pollution to the environment. Similarly, the heat engine can be used to drive an air conditioner as well. The principle and the real design are similar to the engine-refrigerator cycle and are shown in FIG. 7 and FIG. 9, respectively. In FIG. 7, a working block diagram for a system 700 having an air conditioner 780, an engine 740 and a heat reservoir 710 is shown. In FIG. 9, a system 900 corresponding to the system 700 in FIG. 7 is shown to have an air conditioner 980. In FIG. 10, a complete heat recycle network 1000 utilizing the principle discussed in this invention that connect the generator, air conditioner, refrigerator, and the water heater together to form a self-sustained working cycle. Because working principle mimic the ecosystem and has no harm to the environment, it can be called as "Environmental Friendly Ecological Heating-Cooling Network." The invention can be utilized for the production of electricity and recovery of waste heat in homes, offices, and any building structures.

Figure 11:
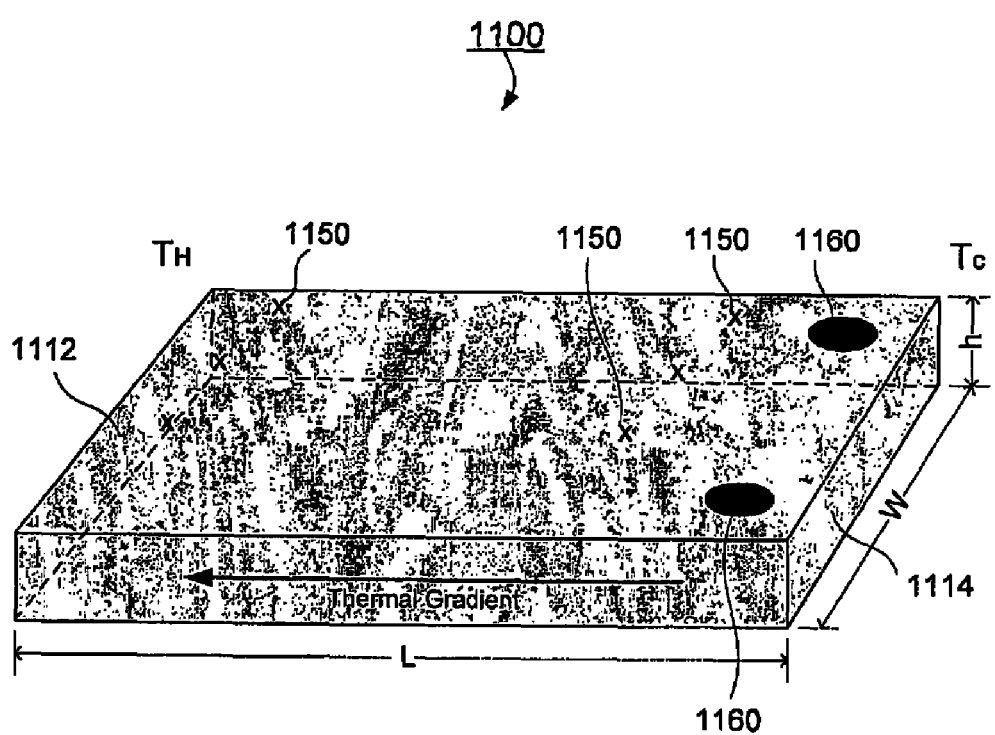
FIG. 11 shows a test cell for the driving mechanism according to one embodiment of the present invention. Cooling was done by circulating cold water. Three pairs of thermocouples are adapted for detecting temperature difference between the hot and cold sides. Permanent magnets are at hot and cold ends of the cell. $T_c$: temperature at cold side; $T_h$: temperature at hot side.
Figure 12A:
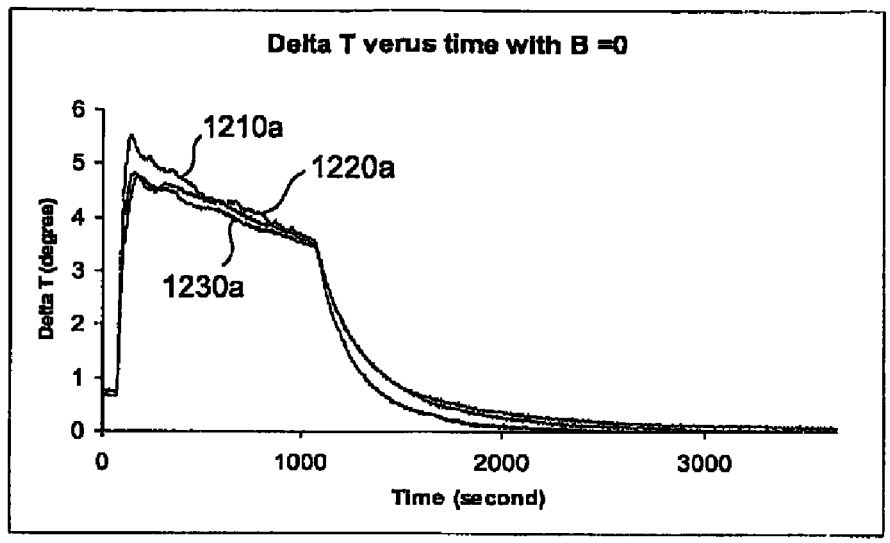
FIG. 12(a) shows the temperature difference between hot and cold sides (Delta T) from three pairs of thermocouples in a rectangular cell in zero magnetic field. Cooling water at cold side was turned on at t=60 seconds and turned off at t=1000 seconds.
Figure 12B:
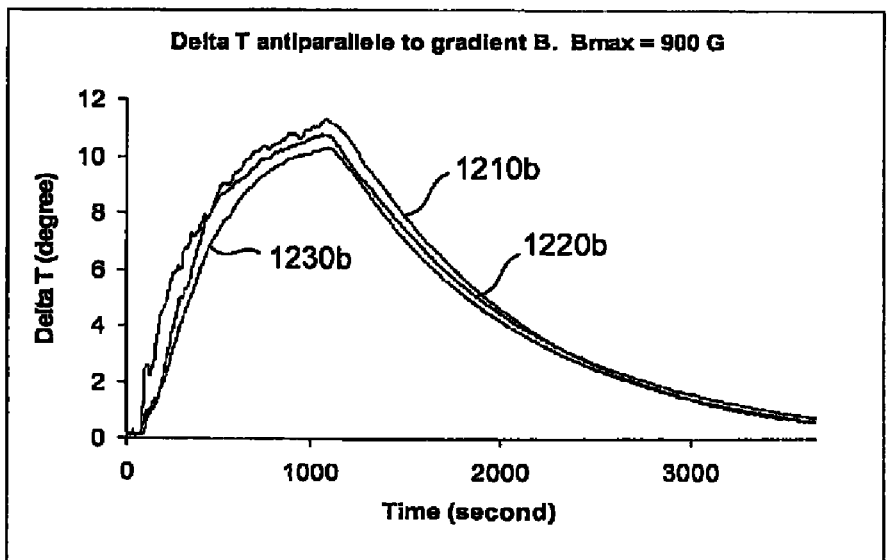
FIG. 12(b) shows results from experiment similar to FIG. 12(a) but in a magnetic field whose value at the pole is 900 Gauss (much less at the center of the two poles). The field was turned on before the cooling starts. Apparently magnetic field increases the temperature gradient between the hot and cold sides.
Figure 13:
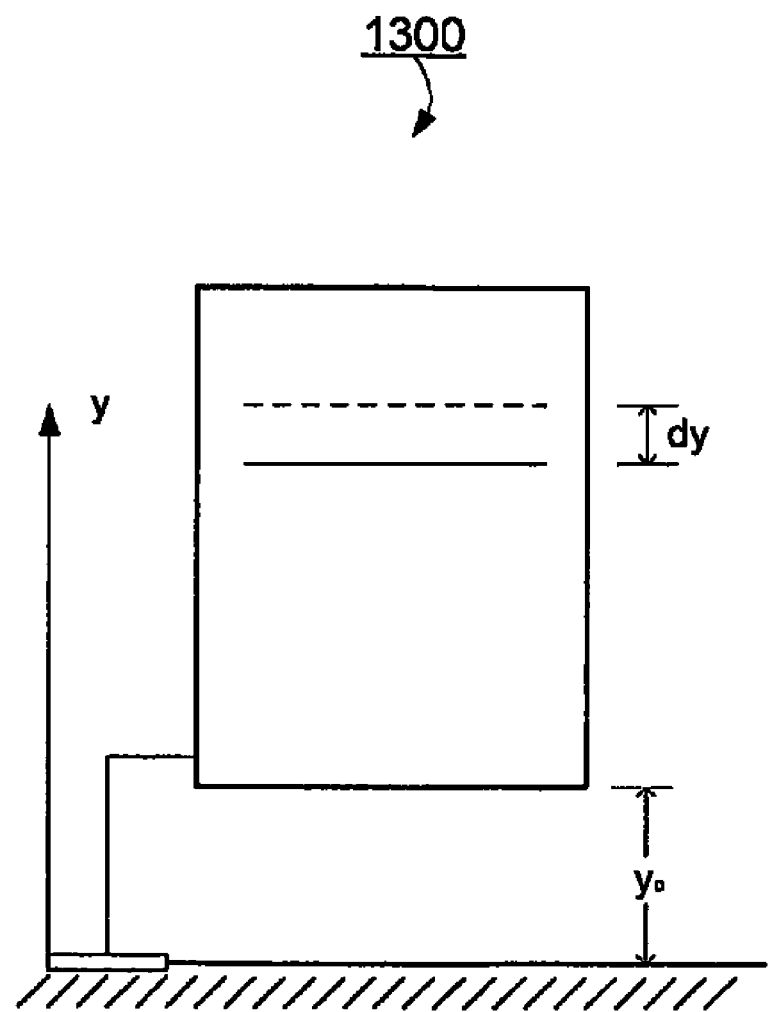
FIG. 13 shows a tank with a potential energy that may be related to one embodiment of the present invention.

An experiment was designed to test the driving mechanism proposed here. If magnetic force can indeed transfer deposited heat (cold) from the low (high) temperature to high (low) temperature, then the temperature gradient between two boundaries should be larger in applied field than in zero field. A testing cell 1100 is shown in FIG. 11 having an end 1112 with temperature $T_h$ and an opposite end 1114 with temperature T. Cooling was done by circulating cold water at one side of the cell through openings 1160, 1160. Three pairs of thermal couples 1150 were used to detect temperatures at two sides of the sample cell as illustrated in FIG. 11. The cooling was turned on at t=60 seconds we wait to t=1000 seconds to turn off the cooling and let the temperature in the system to relax back to room temperature. The fluid chosen is a magnetic fluid consisting of magnetic nanoparticles suspended in nonmagnetic solvent. In FIG. 12, results were shown for both zero field (FIG. 12 (a)) and in field whose maximum value at the pole is 900 Gauss. Curves 1210a, 1220a, 1230a are corresponding to results from 3 separate tests. In zero field, the maximum temperature difference (Delta T) between the hot and cold ends are around 6 degree of Celsius after the cooling was turned on then decreases to about 4 degree of Celsius before cooling was turned off. While in applied field, Delta I reaches 12 degree and continues to increase before the cooling water was turned off. Again, curves 1210*b*, 1220*b*, 1230*b* are corresponding to results from 3 separate tests. Relaxation back to zero temperature in field is also obviously slower than in zero field. Both suggest that magnetic force indeed could not only sustain but in fact enhance temperature difference between the hot and the cold sides, qualitatively agreeing with the driving mechanism discussed in this work.

Thus, one aspect of the present invention relates to provide a mechanism to transfer deposited heat (cold) in a fluid system from low (high) to high (low) temperature by a differential magneto-thermal force.

Another aspect of the present invention is to use the above mechanism to establish an energy flow cycle, which does not release "waste energy" to the environment.

A further aspect of the present invention is to apply said energy cycle for an operational single-heat-source engine/generator that has nearly perfect efficiency.

An additional aspect of the present invention is to use afore-mentioned mechanism to provide a steam engine/generator that once started, will continue to operate through recycling the "waste heat" with less supply of external energy comparing to the current technology.

Yet another aspect of the present invention is to provide a steam engine/generator with enhanced performance by utilizing a fluid with higher-than-normal magnetic susceptibility, e.g. fluid containing magnetic particles.

Yet a further aspect of the present invention is to provide a steam engine/generator that has increased output energy by taking advantage of solar energy.

Yet an additional aspect of the present invention is to apply afore-mentioned mechanism to design a new generation of generator-refrigerator hybrid where the steam generator provides the power to run a refrigerator while the "waste heat" from the refrigerator is reused as "fuel" to the generator reservoir to increase the generator's power output.

Yet an additional aspect is to apply afore-mentioned mechanism for generator-refrigerator hybrid to a generator-air conditioner hybrid or any other heat-transferring device.

Yet an additional aspect of the present invention is to extend the afore-mentioned hybrid generator/engines to a complete heat-flow network that provides power to heat-transferring devices on the network and recycling the "waste heat" from each one of them while taking advantage of natural energy source such as sunlight. Thus-designed network has absolutely no "waste" output to the environment.

Yet an additional aspect of the present invention is to apply the afore-mentioned mechanism to similar heat cycle and network driven by differential electrical instead of magneto-thermo force by simply replacing the magnetic field and field gradient with electric field and field gradient in all designs.

Yet an additional aspect of the present patent is to apply the aforementioned mechanism to similar heat cycle and network driven by the combination of magnetic, electric, and other forces such as gravity.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Clausius, R., *Mechanical Theory of Heat*, 1867, London: John van Vorst.

[2]. Kastler, A., L'oeuvre posthume de Sadi Carnot, in Sadi Carnot et l'Essor de la Thermodynamique, A.N. Editor (ed.) 1974, Paris: CNRS.

[3]. Mendoza, E. (ed.) Reflections on the Motive Force of fire by Sadi Carnot and other Papers on the Second Law of Thermodynamics by E. Claperron and R. Clausius. 1977, Glouster, Mass.: Peter Smith.

[4]. See, for example, D. V. Schroeder, An Introduction to Thermal Physics, 2000, Addison Wesley Longman.

[5]. Weili Luo, Tengda Du, and Jie Huang, "Novel Convective Instabilties in a Magnetic Fluid." Phys. Rev. Lett, vol 82, 4134-4137, 1999.

What is claimed is:

1. A method of heat energy transfer, comprising the steps of:
   a. establishing a temperature gradient along a first direction in a heat reservoir with a medium and having a first end portion and an opposite, second end portion defining a length, L, therebetween, wherein the first direction is from the first end portion to the second end portion, such that the first end portion has a first temperature, $T_h$, and the second end portion has a second temperature, $T_l < T_h$; and
   b. applying an electromagnetic field in the heat reservoir to establish an electromagnetic field gradient along a second direction to generate a driving force to transfer heat energy from the second end portion to the first end portion.

2. The method of claim 1, wherein the electromagnetic field comprises a magnetic field, and the driving force comprises a differential magneto-thermal force having a force density, $f_m$, satisfying:

$$f_m = \mu_o \chi \nabla H^2$$
$$= \frac{\mu_o \chi H_o^2}{(1+\chi)^2} \left( \frac{1}{H_o} \frac{dH_o}{dZ} + \frac{\chi}{(1+\chi)} \frac{1}{T} \frac{dT}{dZ} \right)$$

where $H_o$ represents the strength of the applied magnetic field, $dH_o/dZ$ is the external field gradient along the length L, $\chi$ is the magnetic susceptibility of the medium, $dT/dZ$ is the local temperature gradient along the length L, and $\mu_o$ is the permeability in vacuum.

3. The method of claim 2, wherein the second direction is opposite to the first direction.

4. The method of claim 2, wherein $dH_o/dZ$ and $dT/dZ$ have opposite signs.

5. The method of claim 2, further comprising the step of placing at least a pair of permanent magnets and proximate to the first end portion and the second end portion of the heat reservoir, respectively, to generate a magnetic field.

6. The method of claim 2, wherein the medium has a nonzero magnetic susceptibility.

7. The method of claim 6, wherein the medium comprises a paramagnetic or diamagnetic medium.

8. The method of claim 7, wherein the paramagnetic medium comprises solvent and magnetic particles.

9. The method of claim 1, wherein the electromagnetic field comprises an electric field, and the driving force comprises an electric force.

10. A system of heat energy transfer, comprising:
   a. a heat reservoir with a medium and having a first end portion and an opposite, second end portion defining a length, L, therebetween;
   b. means for establishing a temperature gradient along a first direction in the heat reservoir, wherein the first direction is from the first end portion to the second end portion, such that the first end portion has a first temperature, $T_h$, and the second end portion has a second temperature, $T_l < T_h$; and
   c. means for applying an electromagnetic field in the heat reservoir to establish an electromagnetic field gradient along a second direction to generate a driving force to transfer heat energy from the second end portion to the first end portion.

11. The system of claim 10, wherein the electromagnetic field comprises a magnetic field, and the driving force comprises a differential magneto-thermal force having a force density, $f_m$, satisfying:

$$f_m = \mu_o \chi \nabla H^2$$
$$= \frac{\mu_o \chi H_o^2}{(1+\chi)^2}\left(\frac{1}{H_o}\frac{dH_o}{dZ} + \frac{\chi}{(1+\chi)}\frac{1}{T}\frac{dT}{dZ}\right)$$

where $H_o$ represents the strength of the applied magnetic field, $dH_o/dZ$ is the external field gradient along the length L, $\chi$ is the magnetic susceptibility of the medium, $dT/dZ$ is the local temperature gradient along the length L, and $\mu_o$ is the permeability in vacuum.

12. The system of claim 11, wherein the second direction is opposite to the first direction.

13. The system of claim 11, wherein $dH_o/dZ$ and $dT/dZ$ have opposite signs.

14. The system of claim 11, wherein the means for applying an electromagnetic field comprises at least a pair of permanent magnets and placed proximate to the first end portion and the second end portion of the heat reservoir, respectively, to generate a magnetic field.

15. The system of claim 11, wherein the medium has a nonzero magnetic susceptibility.

16. The system of claim 15, wherein the medium comprises a paramagnetic or diamagnetic medium.

17. The system of claim 16, wherein the paramagnetic medium comprises solvent and magnetic particles.

18. The system of claim 10, wherein the electromagnetic field comprises an electric field, and the driving force comprises an electric force.

19. The system of claim 18, wherein the means for applying an electromagnetic field comprises a DC or an AC electric source connectable to the first end portion and the second end portion of the heat reservoir, respectively, to generate an electric field.

20. A system of heat energy transfer, comprising:
   a. a heat reservoir with a medium and having a first end portion and a second end portion defining a length, L, therebetween, wherein the first end portion has a first temperature, $T_h$, and the second end portion has a second temperature, $T_l < T_h$, thereby establishing a temperature gradient along the heat reservoir length L in a first direction; and
   b. a field applied to the heat reservoir to establish a field gradient along the heat reservoir length L in a second direction, wherein the applied field generates in the medium a driving force to transfer heat energy from the second end portion to the first end portion of the heat reservoir.

21. The system of claim 20, wherein the applied field comprises a magnetic field, and the medium has a nonzero magnetic susceptibility.

22. The system of claim 21, wherein the medium comprises solvent, paramagnet salt, magnetic particles, or a combination of them.

23. The system of claim 21, further comprising at least a pair of permanent magnets and placed proximate to the first end portion and the second end portion of the heat reservoir, respectively, for generating a magnetic field.

24. The system of claim 21, wherein the driving force comprises a differential magneto-thermal force.

25. The system of claim 20, wherein the applied field comprises an electric field, and the medium has non-zero electric polarizations.

26. The system of claim 25, wherein the driving force comprises a differential electro-thermal force.

27. The system of claim 20, wherein the applied field comprises gravity, and the driving force comprises a gravitation force.

28. The system of claim 20, further comprising a coil helically formed in a cone-shaped form having an apex end and a base end, wherein the coil is placed in the heat reservoir such that the apex end and the base end of the coil are proximate to the first end portion and the second end portion of the heat reservoir, respectively.

29. The system of claim 28, further comprising an engine or a power generator having an input, a first output and a second output, wherein the input is in communication with the heat reservoir through the first end portion of the heat reservoir, and the first output is in communication with the heat reservoir through the apex end of the coil placed in the heat reservoir.

30. The system of claim 29, wherein in operation, the engine or power generator absorbs an amount of heat, $Q_1$, from the heat reservoir through the input to generate an amount of work, W, outputting from the second output, and deposits an amount of heat, $Q_2$, to the heat reservoir through the first output, wherein $Q_2=(Q_1-W)$.

31. The system of claim 20, further comprising an additional reservoir being in fluid communication with the heat reservoir, wherein the additional reservoir is adapted to have a potential energy higher than that of the heat reservoir.

32. The system of claim 20, further comprising an input channel in communication with the heat reservoir for inputting an amount of external energy into the heat reservoir at the first end portion.

33. The apparatus of claim 32, wherein the external energy comprises solar energy.

34. An apparatus of converting heat energy into mechanical or electric energy, comprising:
   a. a heat reservoir with a medium;
   b. means for establishing a temperature gradient in the heat reservoir;
   c. means for generating a differential magneto-thermal force in the heat reservoir, wherein the differential magneto-thermal force is capable of transferring heat energy from a first position having a low temperature to a second position having a high temperature in relation to the heat reservoir; and d. an engine or a power generator having an input, a first output and a second output, wherein the input is in communication with the heat reservoir through the first end portion, and the first output is in communication with the heat reservoir through the apex end of the coil placed in the heat reservoir, wherein in operation, the engine or power generator absorbs an amount of heat, $Q_1$, from the reservoir through the input to generate an amount of work, W, outputting from the second output, and deposits an amount of heat, $Q_2$, to the reservoir through the first output, wherein $W=(Q_1-Q_2)$.

35. The apparatus of claim 34, wherein the heat reservoir has a first end portion and a second end portion defining a length, L, therebetween, wherein the first end portion has a first temperature, $T_h$, and the second end portion has a second temperature, $T_l < T_h$.

36. The apparatus of claim 34, wherein the medium has a nonzero magnetic susceptibility.

37. The apparatus of claim 36, wherein the means for generating a differential magneto-thermal force comprises at least a pair of permanent magnets and placed proximate to the first end portion and the second end portion of the heat reservoir, respectively.

38. A method of converting heat energy of a heat reservoir with a medium to mechanical or electric energy, wherein the heat reservoir has a first end portion with a first temperature and an opposite, second end portion with a second temperature that is lower than the first temperature, comprising the steps of:

a. providing an engine or a power generator with an amount of heat energy, $Q_1$, from the first end portion of the heat reservoir;

b. converting the amount of heat energy into an amount of mechanical or electric energy, W, from the engine or power generator;

c. depositing the remaining heat energy, $Q_2$, from the engine or power generator to the second end portion of the heat reservoir, wherein $Q_2=(Q_1-W)$; and d. transferring heat energy from the second end portion to the first end portion of the heat reservoir.

39. The method of claim 38, further comprising the step of applying a magnetic field between the first end portion and the second end portion of the heat reservoir, and the medium comprises a paramagnetic or diamagnetic medium.

40. The method of claim 39, wherein the paramagnetic medium comprises magnetic particles.

41. The method of claim 38, wherein the transferring step is performed by a differential magneto-thermal force.

42. The method of claim 41, wherein the differential magneto-thermal force is a function of the applied magnetic field, the field gradient, and the temperature gradient in the heat reservoir.

43. The method of claim 38, wherein the depositing step is performed with a coil helically formed in a cone-shaped form having an apex end and a base end, wherein the coil is placed in the reservoir such that the apex end and the base end of the coil are proximate to the first end portion and the second temperature end portion of the reservoir, respectively.

44. The method of claim 43, wherein the depositing step comprises the steps of:

a. depositing a residual substance carrying on the remaining heat energy $Q_2$ from the engine or power generator to the coil from the apex end of the coil; and b. delivering the residual substance in the coil to the second end portion of the reservoir from the apex end of the coil.

45. The method of claim 38, further comprising the step of inputting an amount of external energy into the reservoir at the first end portion, wherein the external energy comprises solar energy.

46. The method of claim 38, wherein the medium has non-zero electric polarizations, and the driving force comprises an electric force.

47. The method of claim 38, wherein the driving force comprises a gravitation force.

* * * * *